(12) United States Patent
Iyer et al.

(10) Patent No.: US 7,136,926 B1
(45) Date of Patent: Nov. 14, 2006

(54) METHOD AND APPARATUS FOR HIGH-SPEED NETWORK RULE PROCESSING

(75) Inventors: Raghunath Iyer, Los Altos, CA (US); Sundar Iyer, Palo Alto, CA (US); Moti Jiandani, Fremont, CA (US); Ramana Rao, Hyderabad (IN)

(73) Assignee: PMC-Sierrra US, Inc., Santa Clara, CA (US)

( * ) Notice: Subject to any disclaimer, the term of this patent is extended or adjusted under 35 U.S.C. 154(b) by 0 days.

(21) Appl. No.: 09/224,382

(22) Filed: Dec. 31, 1998

(51) Int. Cl.
*G06F 15/16* (2006.01)
*H04L 12/56* (2006.01)
(52) U.S. Cl. ................... 709/229; 370/389
(58) Field of Classification Search ........... 709/239, 709/238, 229, 240, 241, 242; 713/201; 370/351, 370/389, 428
See application file for complete search history.

(56) References Cited

U.S. PATENT DOCUMENTS

| | | | | |
|---|---|---|---|---|
| 5,951,651 A | * | 9/1999 | Lakshman et al. | ......... 709/239 |
| 5,983,270 A | * | 11/1999 | Abraham et al. | ........... 709/224 |
| 6,147,976 A | * | 11/2000 | Shand et al. | ............. 370/254 |
| 6,154,446 A | * | 11/2000 | Kadambi et al. | .......... 370/239 |
| 6,173,364 B1 | * | 1/2001 | Zenchelsky et al. | ....... 711/118 |
| 6,182,228 B1 | * | 1/2001 | Boden et al. | ............... 713/201 |
| 6,185,680 B1 | * | 2/2001 | Shimbo et al. | ............. 713/160 |
| 6,233,686 B1 | * | 5/2001 | Zenchelsky et al. | ....... 713/201 |

* cited by examiner

*Primary Examiner*—Larry D. Donaghue
(74) *Attorney, Agent, or Firm*—Stattler Johansen & Adeli LLP (57) ABSTRACT

As Internet packet flow increases, the demand for high speed packet filtering has grown. The present invention introduces a high-speed rule processing method that may be used for packet filtering. The method pre-processes a set of packet filtering rules such that the rules may be searched in parallel by a set of independent search units. Specifically, the rules are divided into N orthogonal dimensions that comprise aspects of each packet that may be examined and tested. Each of the N dimensions are then divided into a set of dimension rule ranges. Each rule range is assigned a value that specifies the rules that may apply in that range. The rule preprocessing is completed by creating a search structure to be used for classifying a packet into one of the rule ranges in each of the N dimensions. Each search structure may be used by an independent search unit such that all N dimensions may be searched concurrently. The packet processing method of the present invention activates the N independent search units to search the N pre-processor created search structures. The output of each of the N search structures is then logically combined to select a rule to be applied.

20 Claims, 8 Drawing Sheets

METHOD AND APPARATUS FOR HIGH-SPEED NETWORK RULE PROCESSING

FIELD OF THE INVENTION

The present invention relates to the field of computer networking. In particular the present invention discloses a method and apparatus for quickly processing packets that are tested with a large number of rules.

BACKGROUND OF THE INVENTION

The Internet is a global interconnection of computer networks that share a set of well-defined data communication protocols. Specifically, most computer networks coupled to the global Internet communicate using the Transport Control Protocol (TCP) and Internet Protocol (IP).

A very large portion of the computers communicate on the global Internet are coupled to a local area network (LAN) that is coupled to the global Internet with an Internet gateway. The Internet gateway handles all communication between computers on the local area network and computers out on the global Internet. The Internet gateway may perform many different functions such as network address translation, network caching, routing, and packet filtering.

Packet filtering is the task of examining each packet to apply a set of filtering rules. Each packet filtering rule specifies a particular packet filtering policy. For example, all packets incoming from the Internet that are destined for vulnerable server ports may be discarded in order to protect the internal servers on the local area network.

The number of packet filtering rules that are needed depends on the particular application. In simple packet filtering routers for small or home routers, the number of packet filtering rules is relatively small. However, an internet service provider (ISP) that provides classes of service for the internet service provider's customers, the internet service provider will need many thousands of packet filter rules to implement the class of service priority and other customer features.

There are several different current implementations of packet filtering rule processors. The simplest implementation of a rules processor is a linear searching rule processor. In such an implementation, the linear rule processor tests each received packet against each rule in the list of packet filtering rules. The time required to perform this type of rule processing is directly proportional to the number of packet filtering rules. This type of linear rule processing is not feasible for any system with a large number of packet filtering rules.

To provide faster rule processing, improved methods of applying packet filtering rules were introduced. One improved method is known as "rule splitting" A rule splitting system divides the rules into several different sets of rules. When a packet is received, one or more aspects of the packet are examined to determine which subset of rules should be applied. For example, a rule splitting type of rule processor may only examine the Source and/or Destination ports of each packet in order to determine which set of rules to apply. Rule splitting type of rule processors are difficult to implement because rules have ranges associated with them.

Search trees provide another method of improving rule processing speed. Search trees divide the rules into a pre-processed organized format that improves the rule processing to a speed that is a logarithmic function of the number of rules in each dimension. This type of searching works well, but still does not provide a solution that is viable for high-speed network applications that require many thousands of rules. It would therefore be desirable to have an improved network rule processor that can process thousands of network rules.

SUMMARY OF THE INVENTION

The present invention introduces a high-speed rule processing method that may be used for packet filtering. The high-speed rule processor pre-processes a set of packet filtering rules such that the rules may be searched in parallel by a set of independent search units.

In the rule pre-processing of the method of the present invention, a set of packet filtering rules are first divided the rules into N dimensions. The N dimensions are orthogonal aspects of each packet that may be examined and tested in each rule. Each of the N dimensions are then divided into a set of dimension rule ranges wherein each rule range defines a non-overlapping contiguous range of values in a particular dimension and the rules that may apply to packets that fall within that rule range. Each rule range may be assigned an R-length bit vector that specifies the rules that may apply to packets that fall within that rule range. If the rules are prioritized wherein only the highest priority rule will be applied then such bit vectors will be organized into an order bit vector wherein the highest priority rule is at the beginning of the rule bit vector and the lowest priority rule will be at the end of the rule bit vector. The rule preprocessing is completed by creating a search structure (such as a look-up table, Patricia tree structure, or binary tree structure) for each of the N dimensions. Each search structure may be used by an independent search unit such that all N dimensions may be searched concurrently.

The packet processing method of the present invention activates the N independent search units to search the N pre-processor created search structures. In one embodiment, the output of each of the N search structures will be an R-length bit vector. In such an embodiment, the N output bit vectors are logically ANDed together to produce a final rule bit vector that is used to select the rule or rule to be applied. If the rules are prioritized, then only the first matching rule (the highest priority rule) will be applied.

Other objects, features, and advantages of present invention will be apparent from the company drawings and from the following detailed description.

BRIEF DESCRIPTION OF THE DRAWINGS

The objects, features and advantages of the present invention will be apparent to one skilled in the art, in view of the following detailed description in which.

DETAILED DESCRIPTION OF THE PREFERRED EMBODIMENT

A method and apparatus for performing high-speed network rule processing is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to an embodiment within a gateway that coupled a local area network to the global Internet. However, the same rule processing engine can easily be used in other applications such as general purpose routers, firewalls, and routers that give priority to packets having a higher class of service. Furthermore, the rule processing teachings of the present invention have been disclosed in a packet filtering application although the rule processing teachings may be used in many other contexts.

Network Packet Filtering

Network packet filtering is the task of examining each packet received from a network and then applying a set of packet filtering rules to the received packets. There are a number of uses for network packet filtering. For example, packet filtering can be used to provide security for a local area network by filtering out packets from potential intruders.

Example Packet Filtering Applications

Figure 1:
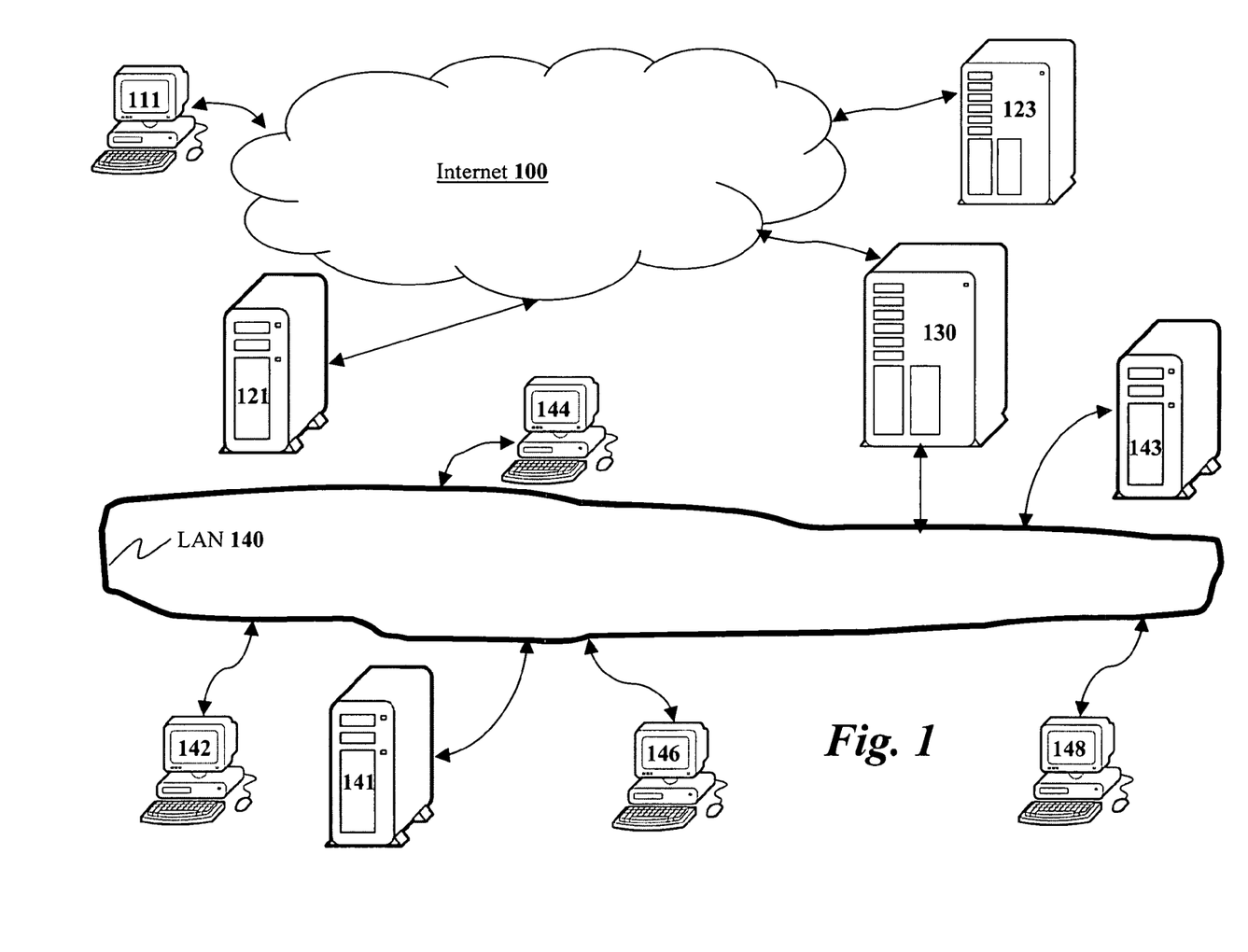
FIG. 1 illustrates a typical small local area network (LAN) coupled to the Internet through a packet filtering device that filters the packets that travel between the global Internet and the local area network.

FIG. 1 illustrates one possible network application of packet filtering. Referring to FIG. 1, a local area network (LAN) 140 is illustrated with a set of computer workstations 142, 144, 146, and 148 coupled thereto. The local area network (LAN) 140 environment also includes a couple of servers 141 and 143. If the servers 141 and 143 are only used for internal purposes then the internal servers 141 and 143 should only be accessible by internal clients such as computer workstations 142, 144, 146, and 148.

All communication between computer systems on the internal local area network 140 and the global Internet 100 passes through an Internet gateway 130. The Internet gateway 130 may comprise a suite of firewall applications on a computer system, a packet filtering router, or another type of network component that provides the desired features. Of particular interest to the present invention, most Internet gateway systems provide packet filtering features.

As specified earlier, an important packet filtering application is network security. Specifically, when a network node on the global Internet 100 attempts to establish a connection to an internal server (such as server 141) on the local area network 140 then the Internet gateway 130 should carefully scrutinize the associate network packets since the entity attempting to establish the connection may be attempting an unauthorized access. To prevent such unauthorized access, the Internet gateway 130 processes packets with a set of security rules that screen out packets related to unauthorized actions. For example, if the servers 141 and 143 are only to be used for internal purposes then the Internet gateway 130 should screen out all packets originating from the global Internet 100 and destined for the internal servers 141 and 143. Such screening will be performed by the packet filtering rule processor of the Internet gateway 130.

There are many different permutations of network security rule policies that may be implemented. For example, if the servers 141 and 143 are only to be used for internal purposes for one set of services (such as an internal database) and global access for other services (such as email) then the packet filtering rules in the Internet gateway 130 should screen out packets originating from the global Internet 100 and destined for the internal servers 141 and 143 only if the service requested is for internal use only. In a TCP/IP environment, the service is usually specified using a TCP port number.

Packet filtering can also be used by an Internet service provider to provide various different classes of service to a set of users. For example, packets from a high priority user will be processed and transmitted faster than packets from a low priority user. With such a packet filtering arrangement, the Internet service provider can charge different prices for different classes of service. There may be many different classes of service offered by the Internet service provider. For example, an Internet service provider may provide a large scale of different services from a free (advertising subsidized) email-only service to a high-speed high-quality service that can be used for low-latency tasks such as video conferencing. Such an application would require a very large number of rules applied to each packet to determine how the packet should be handled (if at all). Current packet filtering implementations are not capable of processing packets with a very large number packet filtering rules with low latency.

Packet Filtering Aspects

Network packets can be filtered by examining a number of different packet aspects. In an Internet application, the most interesting aspects to examine are in the Transport Control Protocol (TCP) packet header (or a UDP packet header) and the Internet Protocol (IP) packet header. In normal Internet usage, TCP packets are enclosed within IP packets.

Figure 2:
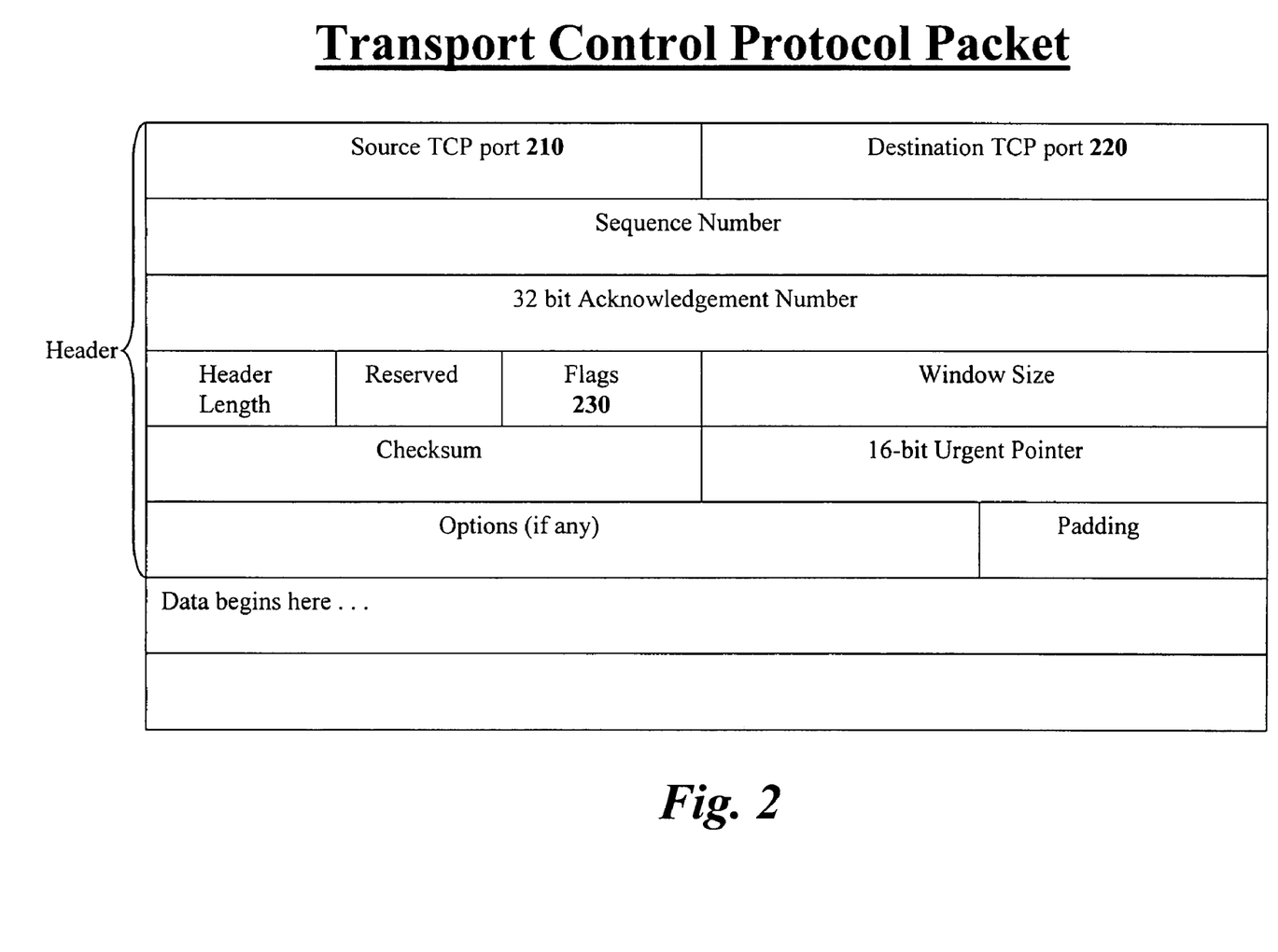
FIG. 2 illustrates the format of a packet from the Transport Control Protocol layer.

FIG. 2 illustrates the format of a Transport Control Protocol (TCP) packet. The objective of the Transport Control Protocol layer is to ensure a reliable connection between two computer nodes. Of particular interest for packet filtering are the source TCP port 210 and the destination TCP port 220. In some applications, a packet filtering device may examine the flags 230 in the TCP packet header.

Figure 3:
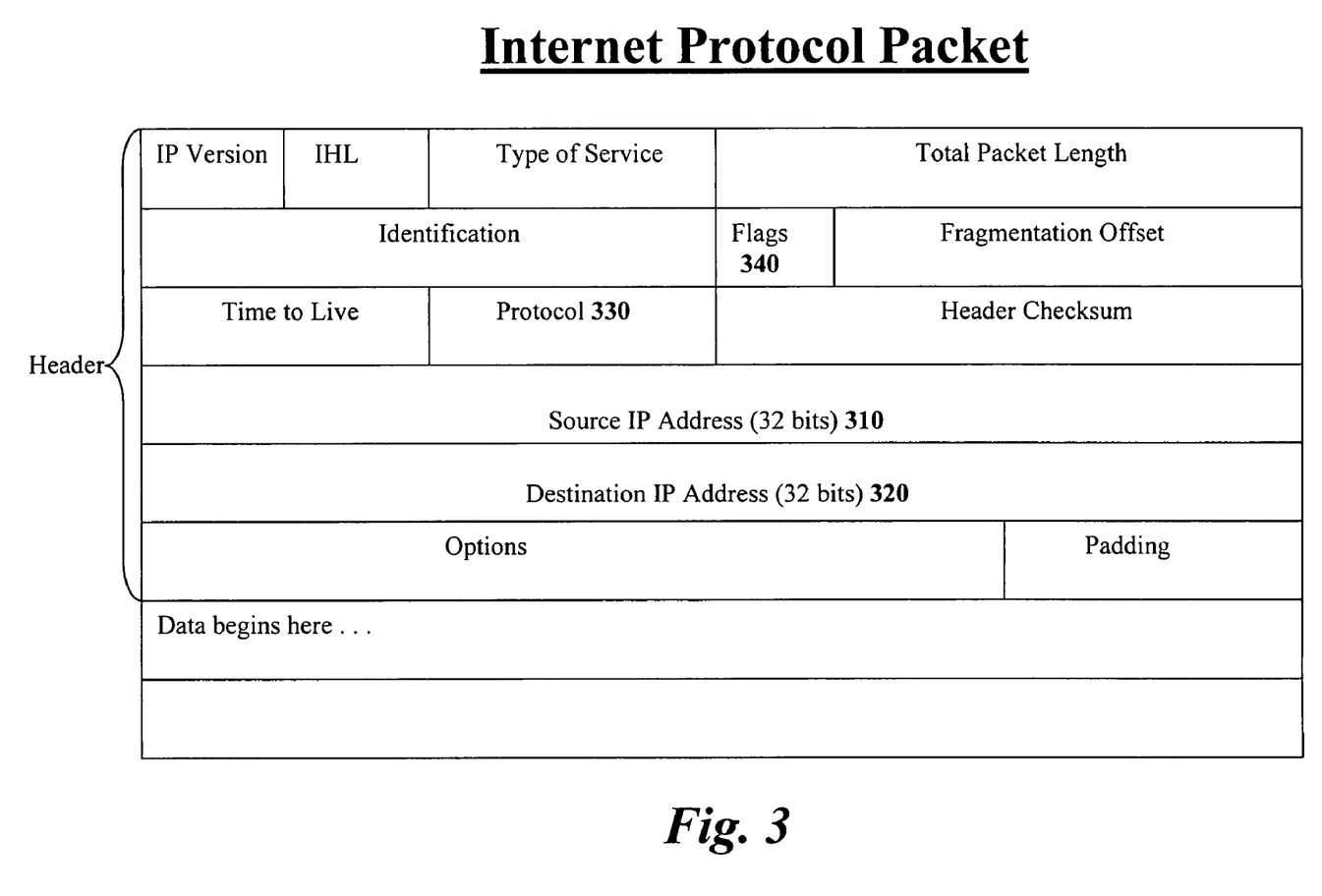
FIG. 3 illustrates the format of a packet from the Internet Protocol layer.

The TCP packet is typically enclosed within an Internet Protocol packet. FIG. 3 illustrates an Internet Protocol (IP) packet header. The objective of the Internet Protocol layer is to ensure that an Internet packet is properly routed from a source node having a source Internet Protocol (IP) address 310 to a destination node having a destination Internet Protocol (IP) address 320. Packet filtering devices examine the source Internet Protocol (IP) address 310 and the destination Internet Protocol (IP) address 320. Another important aspect that may be examined is the Protocol 330 field in the IP packet header. The Protocol 330 field specifies the type of protocol being used to transport the packet. If a TCP packet is enclosed, then the Protocol will specify the TCP protocol. Finally, a packet filter may also examine the flags 340 in the Internet Protocol header.

The Rule Processing Task

The task of rule processing consists of examining a set of aspects for a particular packet and determining the first rule that applies to a packet having those aspects. Each packet filter rule can be expressed as a set of ranges for each packet aspect that will be examined. If all of the packets aspects fit within the defined ranges, then the rule will be applied. When a particular aspect is irrelevant for a particular rule, the rule may specify the full possible range. When a particular aspect must match a certain value exactly, the range for that particular aspect begins and ends with that certain value. Since more than one rule polytope may encompass a particular packet aspect point, the rule filter must select the rule having the higher priority.

Using a set of aspect ranges, packet filtering becomes a problem in computational geometry. Specifically, each packet filtering rule defines a polytope in K dimensions wherein K is the number of packet aspects examined. Thus, given a point defined by the aspects of a packet, the packet filtering engine must find the set of polytopes that encompass the point. For example, FIG. 4 illustrates a pair of two dimensional polytopes that define two different rules in a two aspect (dimension) rule space.

Figure 4:
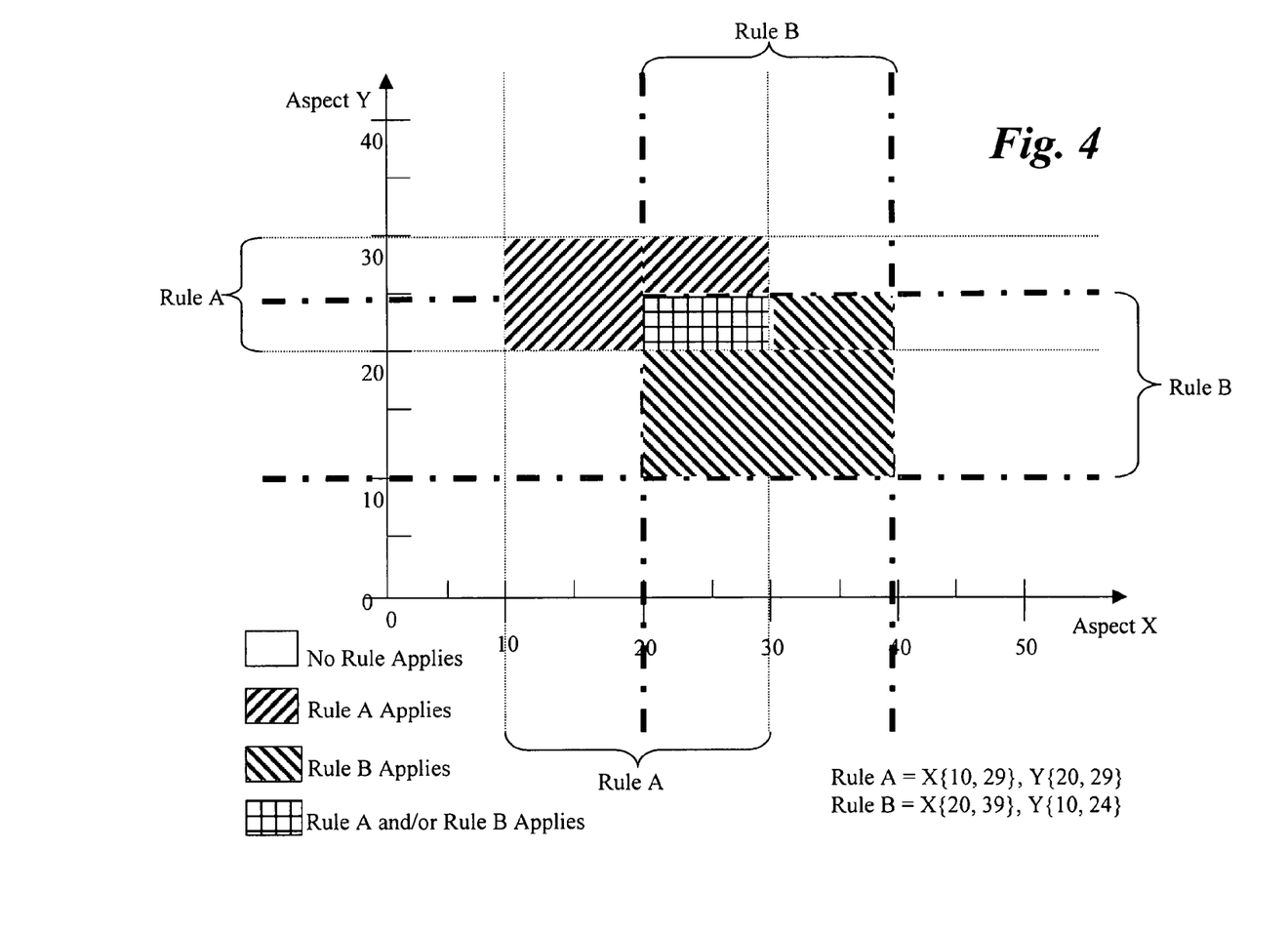
FIG. 4 illustrates a two dimensional rule space that contains two different rules.

In the example of FIG. 4, each aspect is a positive or zero integer. The aspects may be addresses, ports, or other content from received packets. Since there are two aspects that are examined in the example of FIG. 4, the rule space is a two aspect/dimension rule space wherein each rule defines a rectangle polytope. Thus, Rule A forms a first rectangle and Rule B forms a second rectangle. A third aspect/dimensional would create a rectangular solid. Further dimensions are not easily visualized but easily implemented in practice.

High-Speed Packet Filter Rule Processing

To improve the performance of a firewall, router, switch, or other network component that performs packet filtering, the present invention introduces a high-speed rule processing engine. The high-speed rule processing engine pre-processes the rules to divide the rules into different packet aspect dimensions. Each dimension is then divided into individual rule ranges wherein each range has a different set of rules that may apply when compared to the adjacent ranges. Each range is then assigned a bit vector that specifies the rules that may be activate when a packet falls within the range. The pre-processing is completed by creating a different data structure to be used for searching each different dimension range. Examples of possible data structures include look-up tables and organized data trees. When a packet is received, all of the search data structures for each aspect dimension are examined in parallel to generate the assigned bit vector for that range. The bit vector results of the parallel rule processors are combined into a final rule or set of rules, that need to be applied to the packet.

Rule Dimension Ranges

To implement a high-speed rule processor for packet filtering, each dimension is divided into distinct dimension rule ranges wherein each distinct dimension rule range adds or omits a possible rule from an adjacent range. For example, FIG. 5 illustrates the two dimensional rule space of FIG. 4 after both dimensions have been divided into distinct dimension rule ranges.

Figure 5:
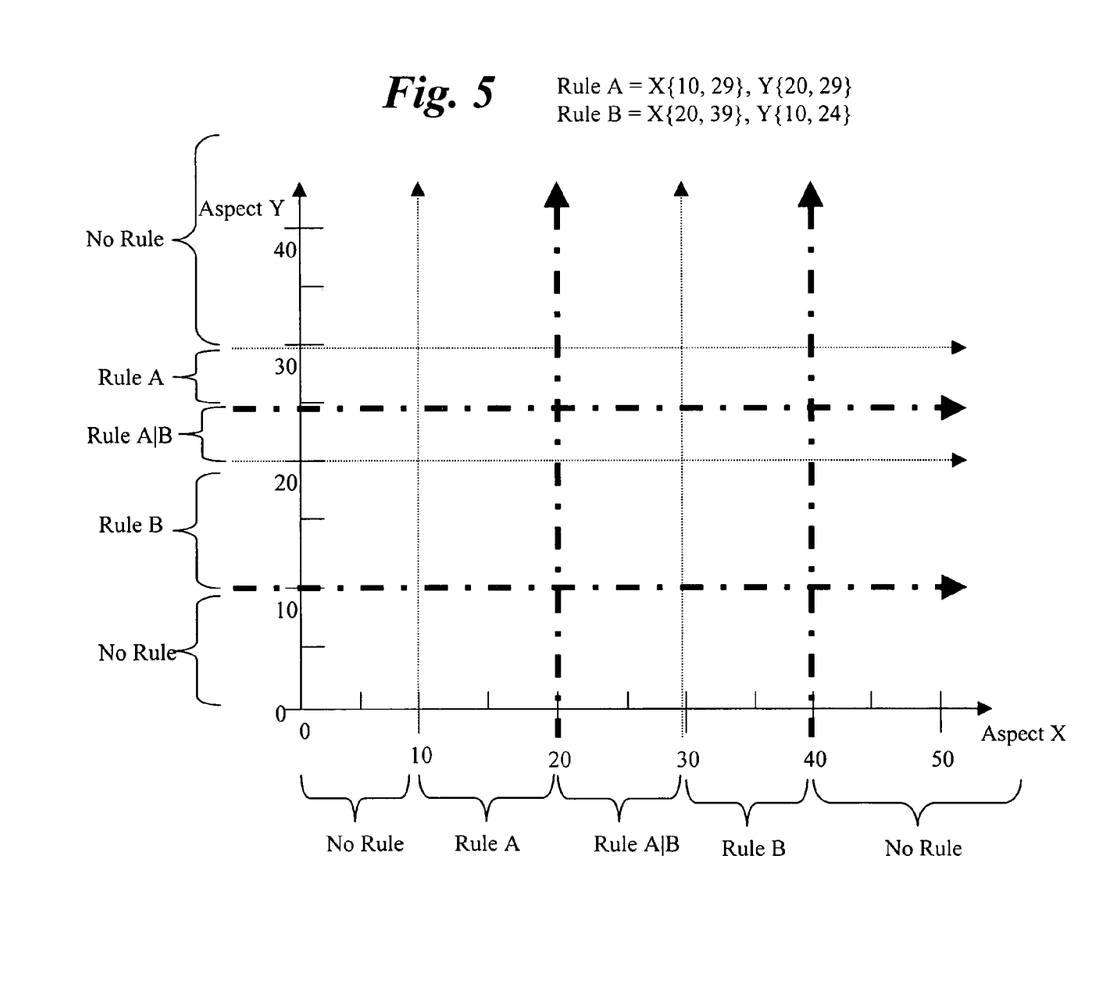
FIG. 5 illustrates the two dimensional rule space of FIG. 4 wherein each dimension has been divided into different rule ranges.

Referring to the X aspect/dimension of FIG. 5, in the range from 0 to 9, no rule applies. In the range from 10 to 19 along the X aspect/dimension, Rule A may apply. (Note that, the Y aspect/dimension must be examined to determine if Rule A really does apply.) In the range from 20 to 29 along the X aspect/dimension, Rules A and/or B may apply. In the range from 30 to 39 along the X aspect/dimension, Rule B may apply. Finally, in the range above 40 in the X aspect/dimension, no rule applies.

The Y aspect/dimension of FIG. 5 is also divided into distinct dimension rule ranges. Specifically, from 0 to 9 in the Y aspect/dimension no rule applies, from 10 to 19 Rule B may apply, from 20 to 24 rules A and/or B may apply, from 25 to 29 rule A may apply, and above 30 no rule applies.

Rule Dimension Range Bit Vectors

Figure 6:
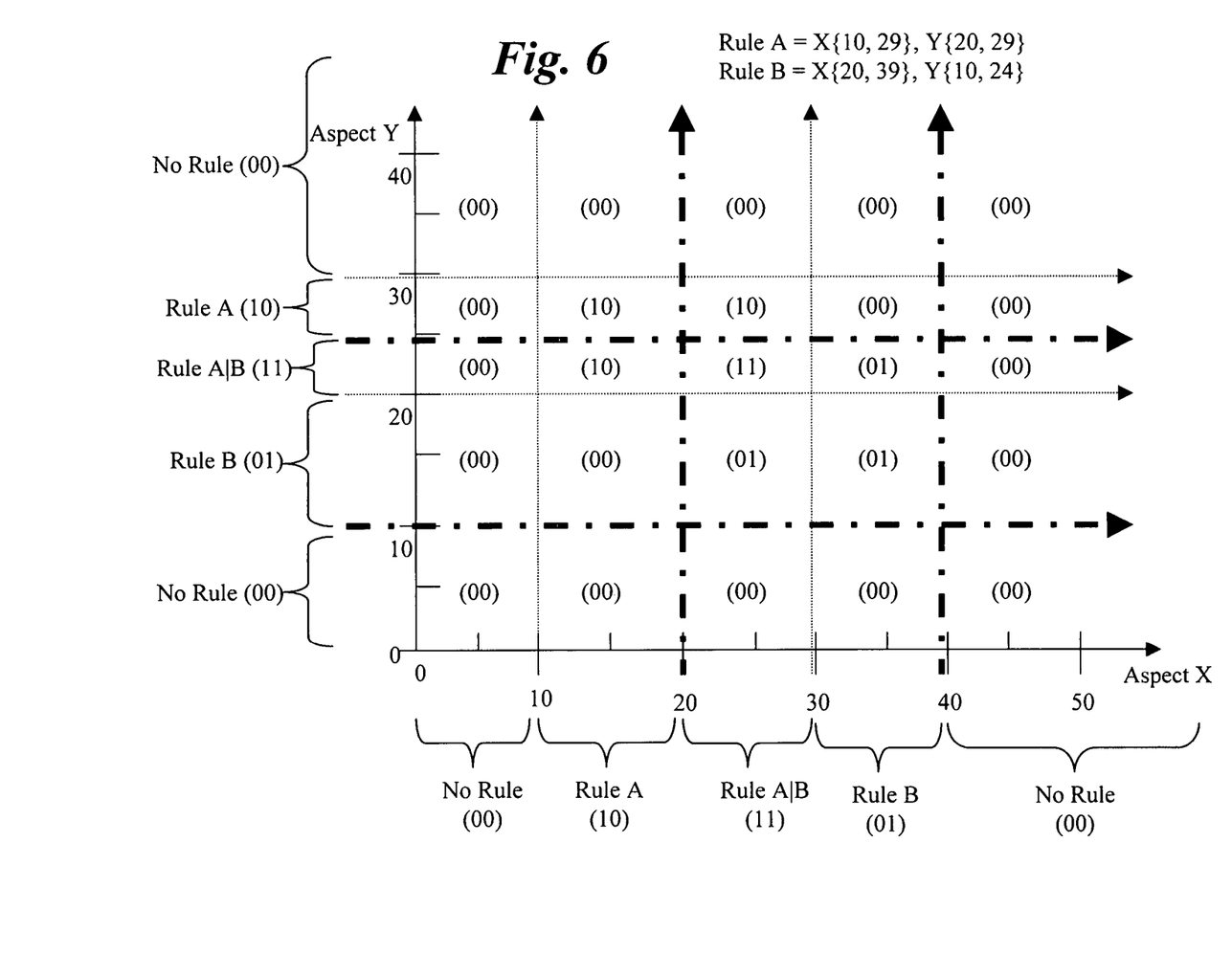
FIG. 6 illustrates the two dimensional rule space of FIG. 5 wherein each rule range has been assigned a bit vector that specifies the rules that may apply.

After each aspect/dimension has been divided into distinct dimension rule ranges, each dimension rule range may be assigned an R-length bit vector that specifies the rules that apply to that particular dimension rule range. The R value specifies the number of rules that are being applied. If the rules are ordered in priority, then the R-length rule bit vector should be ordered in the same manner. FIG. 6 illustrates the two dimensional rule space of FIG. 5 wherein each dimension rule range has been assigned a bit vector. Since there are only two rules, the bit vector is 2 bits in length. The first position in the bit vector designates if points within the range may require Rule A. The second position in the bit vector designates if points within the range may require Rule B.

Referring to FIG. 6, the first range where no rule applies is assigned "00". The second range along the X aspect/dimension wherein Rule A may apply is assigned "10" since Rule A (the first bit in the bit vector) may apply. The third range along the X aspect/dimension wherein both Rule A and Rule B may apply is assigned "11" since both Rule A (the first bit in the bit vector) and Rule A (the second bit in the bit vector) may apply. The remainder of the ranges along the X aspect/dimension are assigned bit vectors in the same manner. The ranges along the Y aspect/dimension are also filled in the same manner.

To use the assigned bit vectors, a packet filtering engine first classifies a received packet into the appropriate range within each dimension. In the example of FIG. 6, each packet is classified into one range along the X aspect/dimension and another range along the Y aspect/dimension. For example, a packet with an X aspect of 23 and Y aspect of 17, written as P(23,17), would be placed into the third range (from the left) along the X aspect/dimension and the second range (from the bottom) along the Y aspect/dimension. The assigned bit vectors from the different dimensions are then logically ANDed together. In the previous example of P(23,17), the "11" bit vector from the X aspect/dimension is logically ANDed with the "01" bit vector from the Y aspect/dimension to generate "01". The "01" resultant vector specifies that the second rule, Rule B, should be applied. For clarity, the ANDed values of all the different range combinations have been placed onto the rule space of FIG. 6.

If an incoming packet has an X aspect of 27 and Y aspect of 21, P(27,21), then the packet would be placed into the third range (from the left) along the X aspect/dimension and the third range (from the bottom) along the Y aspect/dimension. These classifications would output the bit vectors "11" in the X range and "11" in the Y range that are logically ANDed to produce "11". The "11" output bit vector means that both Rule A and Rule B apply to the packet. However, if the rules have been ordered in priority then only the first rule in the bit vector, the first one ("1"), will be used such that only Rule A will be applied.

Alternate Embodiment: Rule Range Look-Up

In an alternate embodiment, each range may simply be assigned a range value. For example, referring to the X aspect/dimension of FIGS. 4 to 6, the range from 0 to 9 could be assigned a range value of 1, the range from 10 to 19 could be assigned the range value of 2, the range from 20 to 29 could be assigned the range value of 3, the range from 30 to 39 could be assigned the range value of 4, and the range above 40 could be assigned the range value of 5. The Y aspect/dimension would be assigned range values in a similar manner. Specifically, in the Y aspect/dimension, from 0 to 9 is rule range 1, 10 to 19 is rule range 2, from 20 to 24 is rule range 3, from 25 to 29 is rule range 4, and above 30 is rule range 5. These range values could then be used to look up a final rule to apply in an N dimensional look-up table. In the case that only the highest priority rule for a given field is needed, that value can be pre-computed amongst all matching rules in a given row and only that rule can be stored for each row in the table. In an embodiment without a pre-computed highest priority rule, the table for the example in FIGS. 4 to 6 might appear as follows:

TABLE 1

| Packet Aspect Range Value in X and Y dimension | Output rule vector |
| --- | --- |
| 1, 1 | 00 |
| 1, 2 | 00 |
| 1, 3 | 00 |
| 1, 4 | 00 |
| 1, 5 | 00 |
| 2, 1 | 00 |
| 2, 2 | 00 |
| 2, 3 | 10 |
| 2, 4 | 10 |
| 2, 5 | 00 |
| 3, 1 | 00 |
| 3, 2 | 01 |
| 3, 3 | 11 |
| 3, 4 | 10 |
| 3, 5 | 10 |
| 4, 1 | 00 |
| 4, 2 | 01 |
| 4, 3 | 01 |
| 4, 5 | 00 |
| 5, 1 | 00 |
| 5, 2 | 00 |
| . | 00 |
| . | |
| . | |

Such a table based system might be useful for systems with small numbers of rules. However the memory that would be required is proportional to two times the number of Rules plus one raised to the power of the number of dimensions, expressed mathematically as $(2*Rules+1)^{(Number\ of\ dimensions)}$. Thus, the memory requirements grow exponentially. Thus, such a system is not feasible for systems with large numbers of rules.

Rule Dimension Range Classification

As previously set forth, each received packet must be classified into a range along each examined packet aspect/dimension. Since these classifications are data independent along the different dimensions, the classification along each dimension may be performed in parallel by individual logic modules. In this manner, a very complex search may be performed by N logical searching units concurrently wherein N indicates the number of dimensions. With independent parallel searching, a single very fast search module is replaced with N search modules with lower clock speeds. The time complexity in such a parallel implementation is reduces to order of log (2R+1) for a binary tree search on each dimension. Then an additional time is required to calculate the bit-wise logical AND of these results. This method is faster than all previously known implementations.

The rule range classification along each dimension is still a time consuming problem. Every new rule raises the amount of time needed for searching each dimension. Specifically, there will be up to 2R+1 rule ranges in each dimension. (2R+1 represents the worst case scenario.) With a dimension that has m possible variations, the task is to classify the incoming packets having m possible variations into one of the up to 2R+1 rule ranges. For example, an 8-bit aspect in a packet will have 256 possible variations.

A simple method of range classifying is to use a long list ranges that specify the required condition of each range. Such a method is simple to implement but requires far too much time to search.

One of the fastest methods of classifying the incoming packets is to create a look-up table structure that maps each possible dimension value into the appropriate bit vector value for the associated rule range. The following table illustrates one possible implementation of a look-up table for the X dimension of the rule space in FIGS. 4 to 6. The table outputs the appropriate bit vector based upon the X aspect of an incoming packet.

TABLE 2

| Packet Aspect Value in X dimension | Output bit vector |
| --- | --- |
| 0 | 00 |
| 1 | 00 |
| 2 | 00 |
| 3 | 00 |
| . | 00 |
| . | |
| . | |
| 9 | 00 |
| 10 | 10 |
| 11 | 10 |
| . | 10 |
| . | |
| . | |
| 19 | 10 |
| 20 | 11 |
| 21 | 11 |
| . | 11 |
| . | |
| . | |
| 29 | 11 |
| 30 | 01 |
| 31 | 01 |
| . | 01 |
| . | |
| . | |
| 39 | 01 |
| 40 | 00 |
| . | 00 |
| . | |
| . | |

The look-up table provides the fastest possible method of classifying a particular dimension into a range with an output bit vector. However, a look-up table is not always feasible. In a system that has a large number of rules and dimensions that have large numbers of possible combinations, the memory required to store a look-up table becomes impractical. For example, a 32 bit IP address has $2^{32}$ possible permutations such that a very large $2^{32}$ entry look-up table would be required. Furthermore, in a system with thousands of rules, each bit vector would be thousands of bits long. Constructing such a large look-up table is not economically feasible.

Figure 7:
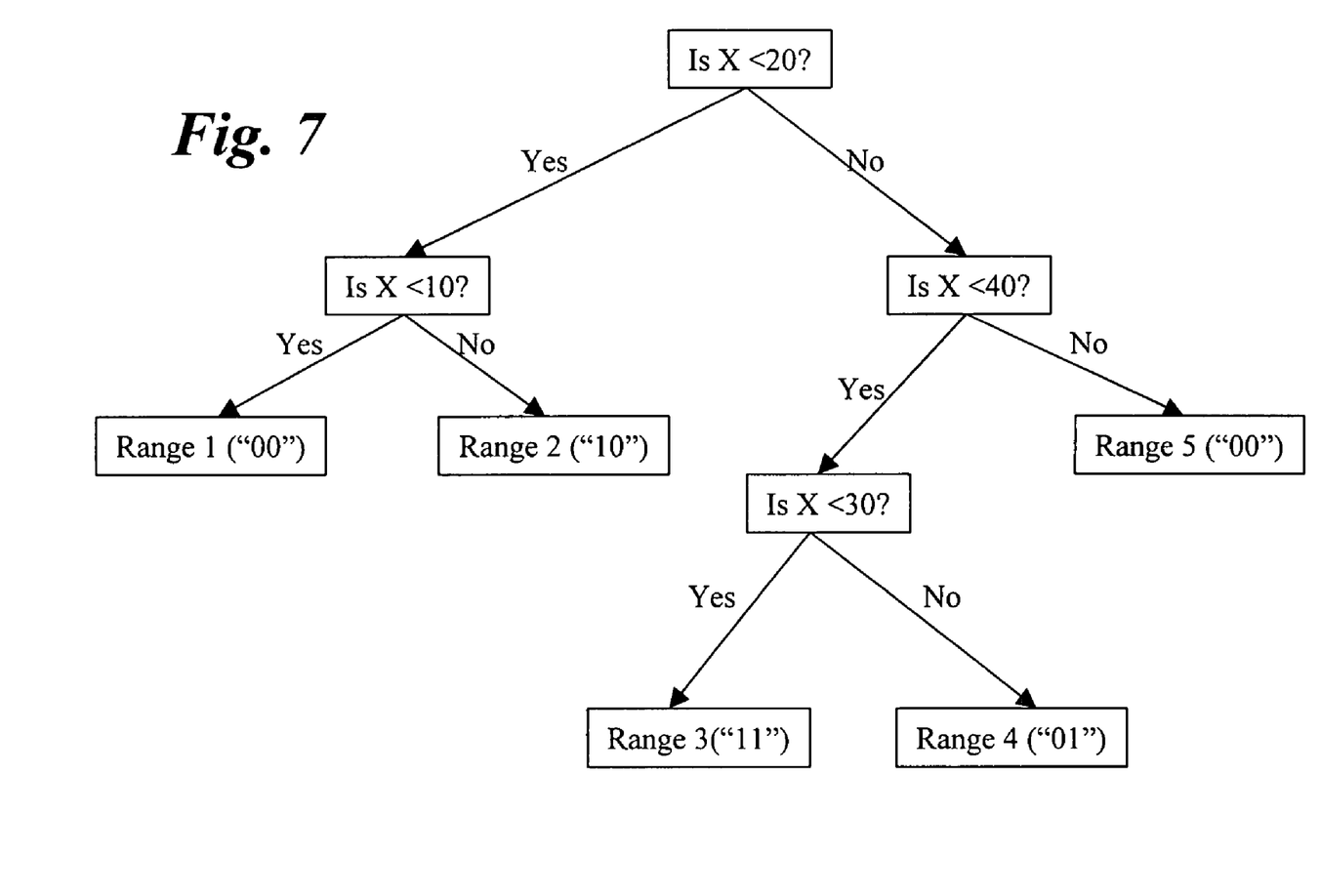
FIG. 7 illustrates a tree structure that may be used to organize the X aspect ranges along the X dimension illustrated in FIGS. 4 to 6.

Another method of creating a data structure for quickly generating bit vectors is to use a search tree structure such as a Patricia tree or a binary tree. A search tree structure greatly reduces the amount of memory required by eliminating redundant data from the search structure. However, a tree structure will require more processing time to search. Specifically, such a tree search will require a time amount that is a logarithmic function of the two times the number of rules plus one. [Order(log(2R+1))] FIG. 7 illustrates one possible tree structure that can be used to quickly search the rule ranges of the X dimension illustrated in FIGS. 4 to 6.

Since the different aspects of a packet will vary in the number of possible combinations, each dimension can be implemented with a different search structure. For example, one possible packet filtering engine would examine a 32-bit source IP address, a 32-bit destination IP address, and an 8-bit protocol value. In such a three dimensional packet filtering system, the relatively small 8-bit protocol dimension could be classified quickly with a two hundred and fifty-six (256) entry look-up table and the larger 32-bit dimensions could be classified using Patricia tree structures or binary tree structures. All three different dimensions could be searched in parallel using three different searching units. The bit vector outputs from the three search units could then be logically ANDed to generate a final rule bit vector that specifies the rule (if rules are prioritized) or rules (if all matching rules are to be applied) to be used on the packet.

Summary

Figure 8:
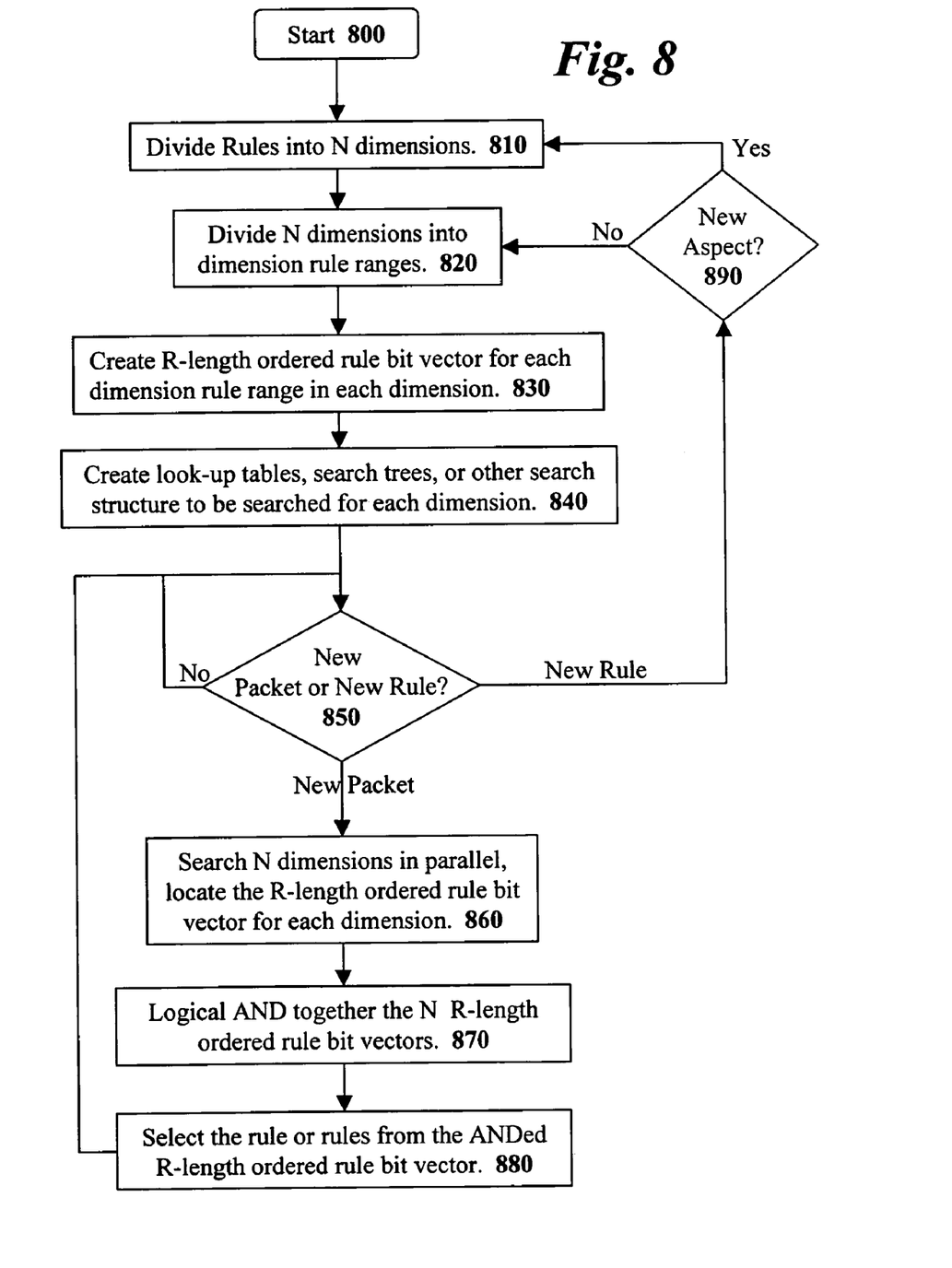
FIG. 8 illustrates a flow diagram that summarizes the rule processing methods of the present invention.

FIG. 8 illustrates a flow chart that summarizes the teachings of the present invention. Referring step 810 of FIG. 8, the first task is to divide the rules into N aspects/dimensions. The N dimensions are orthogonal aspects of each packet that may be examined and tested in each rule. For example, in a packet filtering system that only examines and tests the 32-bit source IP address, a 32-bit IP destination address, the 16-bit source TCP port, and the 16-bit destination TCP port, the packet filtering engine would be divided into four dimensions.

Next, at step 820, each of the N dimensions is divided into a set of dimension rule ranges. Each rule range defines a non-overlapping contiguous range of values in particular dimension and the rules that may apply to packets that fall within that rule range. At step 830, each rule range is assigned an R-length bit vector that specifies the rules that may apply to packets that fall within that rule range. If the rules are prioritized wherein only the highest priority rule will be applied then the bit vectors will be organized into an order bit vector wherein the highest priority rule is at the beginning of the rule bit vector and the lowest priority rule will be at the end of the rule bit vector.

Finally, at step 840, the rule preprocessing is completed by creating a search structure (such as a look-up table, Patricia tree structure, or binary tree structure) for each of the N dimensions. The N search structures may be different for each dimension. Each search structure may be used by an independent search unit such that all N dimensions may be searched concurrently.

At step 850, the packet processing may begin. When a new packet is received at step 850, the method proceeds to step 860 wherein the N dimensions are searched using the created search structures. The output of each of the N search structures will be an R-length bit vector. At step 870, the N output bit vectors are logically ANDed together to produce a final rule bit vector. Finally at step 880, the final rule bit vector is used to select the rule or rules to be applied. If the rules are prioritized, then only the first matching rule (the highest priority rule) will be applied. The method returns back to step 850 to process additional packets.

New rules may be added at step 850. If a new rule is submitted, the method proceeds to step 890 wherein the rule is examined to determine if the new rule examines and tests a new aspect of the packet. If a new aspect is to be tested, then the method proceeds to step 810 wherein a new dimension will be added to the packet filtering engine. Alternatively, if at step 890 the method determines that the new rule will only test an existing packet aspect, then the method proceeds to steps 820 through 840 wherein the new rule is preprocessed to create a new set of rule ranges for each dimensions, new longer rule bit vectors are generated, and new search structures are created.

The foregoing has described a method and apparatus for performing high-speed rule processing for packet filtering. It is contemplated that changes and modifications may be made by one of ordinary skill in the art, to the materials and arrangements of elements of the present invention without departing from the scope of the invention.

We claim:

1. A computer-implemented method of performing network packet filtering on packets received on a network using a set of rules, said method comprising:
    dividing the set of rules along N dimensions;
    dividing each of said N dimensions into rule ranges using said set of rules;
    generating a set of possible rules for each rule range in each of said N dimensions;
    receiving a set of one or more packets on a network;
    searching said rule ranges along said N dimensions in parallel to select N sets of possible rules along said N dimensions;
    logically combining said N sets of possible rules to generate a final set of rules;
    applying said final set of rules;
    repeating said steps of searching, logically combining, and applying for each received packet;
    receiving a new rule;
    examining the new rule to determine if the new rule specifies a new dimension; and
    if it is determined that the new rule specifies a new dimension, adding the new rule to the set of rules, adding the new dimension to the N dimensions, dividing said set of rules along N+1 dimensions, dividing each of said N+1 dimensions into rule ranges using said set of rules, and generating a set of possible rules for each rule range in each of said N+1 dimensions.

2. The method as claimed in claim 1 wherein generating a set of possible rules for each rule range in each of said N dimensions comprises generating a rule bit vector for each rule range along each of said N dimensions.

3. The method as claimed in claim 1 further comprising:
    generating a search structure for each of said N dimensions to locate a specific rule range.

4. The method as claimed in claim 3 wherein one of said search structures comprises a look-up table.

5. The method as claimed in claim 3 wherein one of said search structures comprises a tree search structure.

6. The method as claimed in claim 1 wherein applying said final set of rules comprises selecting a highest priority rule in said final set of rules.

7. The method as claimed in claim 1 wherein applying said final set of rules comprises applying more than one rule in said final set of rules.

8. The method as claimed in claim 1 wherein each of said N sets of possible rules comprise a rule bit vector that specifies a set of rules that may apply.

9. The method as claimed in claim 8 wherein said rule bit vectors are logically ANDed together to produce a final bit vector of rules that apply.

10. The method as claimed in claim 9 wherein applying said final set of rules comprises selecting a highest priority rule in said final set of rules.

11. The method as claimed in claim 1 wherein each rule range comprises a range identifier.

12. The method as claimed in claim 11 wherein said range identifier comprises a rule bit vector that specifies a set of rules that may apply to incoming data units that fall within the associated rule range.

13. The method as claimed in claim 12 wherein said rule bit vectors are logically ANDed together by a rule processor to produce a final bit vector of rules that apply.

14. The method as claimed in claim 11 wherein said range identifier comprises an index value.

15. The method as claimed in claim 14 wherein said index values are used by a rule processor to index into a N dimensional look-up table for a final rule.

16. A computer program product comprising a computer readable medium having instructions stored thereon when executed filter packets received on a network using a set of rules, the computer program product comprising sets of instructions for:

dividing the set of rules along N dimensions;

dividing each of said N dimensions into rule ranges using said set of rules;

generating a set of possible rules for each rule range in each of said N dimensions;

receiving a set of one or more packets on a network;

searching said rule ranges along said N dimensions in parallel to select N sets of possible rules along said N dimensions;

logically combining said N sets of possible rules to generate a final set of rules;

applying said final set of rules;

repeating said steps of searching, logically combining, and applying for each received packet;

receiving a new rule;

examining the new rule to determine if the new rule specifies a new dimension; and if it is determined that the new rule specifies a new dimension, adding the new rule to the set of rules, adding the new dimension to the N dimensions, dividing said set of rules along N+1 dimensions, dividing each of said N+1 dimensions into rule ranges using said set of rules, and generating a set of possible rules for each rule range in each of said N+1 dimensions.

17. The computer program product as claimed in claim 16 wherein the set of instructions for generating a set of possible rules for each rule range in each of said N dimensions comprises a set of instructions for generating a rule bit vector for each rule range along each of said N dimensions.

18. The computer program product as claimed in claim 16 further comprising a set of instructions for:

generating a search structure for each of said N dimensions to locate a specific rule range.

19. The computer program product as claimed in claim 16 wherein the set of instructions for applying said final set of rules comprises a set of instructions for selecting a highest priority rule in said final set of rules.

20. The computer program product as claimed in claim 16 wherein the set of instructions for applying said final set of rules comprises a set of instructions for applying more than one rule in said final set of rules.

* * * * *